United States Patent [19]

Nisimura et al.

[11] Patent Number: 4,993,906
[45] Date of Patent: Feb. 19, 1991

[54] GREEN TIRE FEED SYSTEM BETWEEN FORMING AND VULCANIZING PROCESSES

[75] Inventors: Seiichiro Nisimura; Toshifumi Hata; Kenji Yamashita, all of Kodaira, Japan

[73] Assignee: Bridgestone Corporation, Tokyo, Japan

[21] Appl. No.: 396,724

[22] Filed: Aug. 17, 1989

Related U.S. Application Data

[63] Continuation of Ser. No. 156,697, Feb. 17, 1988, abandoned.

[30] Foreign Application Priority Data

Feb. 27, 1987 [JP] Japan .................................. 62-43165

[51] Int. Cl.⁵ .............................................. B65G 1/04
[52] U.S. Cl. ................................. 414/286; 414/282; 414/277; 414/664; 414/222; 414/744.1; 414/659; 414/273; 206/386
[58] Field of Search ............... 414/277, 331, 280, 281, 414/283, 282, 273, 286, 268, 269, 267, 222, 225, 744.1, 668, 659, 664; 206/386

[56] References Cited

U.S. PATENT DOCUMENTS

| 3,796,327 | 3/1974 | Meyer et al. ...................... 414/222 |
| 4,035,904 | 7/1977 | Ishizaka et al. ................... 414/222 |
| 4,268,219 | 5/1981 | Nakagawa et al. ............. 414/222 X |
| 4,595,332 | 6/1986 | Loomer ............................ 414/282 |

FOREIGN PATENT DOCUMENTS

| 0087469 | 8/1978 | Japan .................................. 414/281 |
| 0013183 | 1/1979 | Japan .................................. 414/273 |
| 0072503 | 5/1982 | Japan .................................. 414/286 |
| 58-31732 | 2/1983 | Japan . |
| 0150908 | 7/1986 | Japan .................................. 414/277 |
| 0053806 | 3/1987 | Japan . |
| 0055124 | 3/1987 | Japan . |
| 0251125 | 10/1987 | Japan . |
| 2174686 | 11/1986 | United Kingdom ................ 414/281 |
| 2188014 | 9/1987 | United Kingdom ................ 414/222 |

Primary Examiner—Frank E. Werner
Attorney, Agent, or Firm—Sughrue, Minn, Zinn, Macpeak & Seas

[57] ABSTRACT

A green tire feed system provided between the forming process and the vulcanizing process in a tire manufacturing installation. This green tire feed system comprises pallets, each adapted to be charged with green tires, pallet loading tables disposed respectively in front of the respective vulcanizing machines installed in a row, shelves disposed in opposition to the pallet loading tables, a stacker crane adapted to travel through a passageway formed between a row of the pallet loading tables and a row of the shelves, a station for receiving pallets sent from forming machines and from the pallet loading tables, and control devices for controlling the stacker crane. The stacker crane is controlled by the control means to transport a pallet charged with green tires form the station to the shelves and from the shelves to the pallet loading table, and to transport an empty pallet from the pallet loading table to the station.

5 Claims, 4 Drawing Sheets

GREEN TIRE FEED SYSTEM BETWEEN FORMING AND VULCANIZING PROCESSES

This is a continuation of application Ser. No. 07/156,697 filed Feb. 17, 1988, now abandoned.

BACKGROUND OF THE INVENTION

1. Field of the invention:

The present invention relates to a system for feeding green tires formed by a forming machine or machines to vulcanizing machines in a tire manufacturing installation in which tires are manufactured through a forming process and a vulcanizing process.

2. Description of the Prior Art:

Heretofore, some examples in which transportation of green tires between forming and vulcanizing processes was automated, are known.

The prior art is a transport system in which an automated warehouse 03 for stocking green tires which serves as a temporary storage is interposed between a forming machine group and a vulcanizing machine group as shown in a schematic plan view in FIG. 5, and which system employs the method that green tires are transported by an unmanned transport truck 04 from each forming machine in the forming machine group to the automated warehouse as charged in pallets, after they have been temporarily stored in the same automated warehouse, in response to a demand issued from a vulcanizing machine a pallet of the corresponding tire size is carried out from the automated warehouse and transported again by an unmanned transport truck 05 to the front of the corresponding vulcanizing machine, and the pallet is mounted on a pallet loading table in front of the vulcanizing machine.

The above-described transport system in the prior art involves such improvement that a flow of green tires between forming machines 01 of different kinds and vulcanizing machines 02 of different kinds is regulated by an automated warehouse 03 therebetween to maintain working efficiencies of the both working machines high and also to make it possible to versatilely deal with variations of a kind and an amount of tires to be manufactured.

However, in such a heretofore known system, since a stacker crane is necessitated for carrying in and carrying out a pallet to and from an automated warehouse and transportation of a pallet to a vulcanizing machine must be effected by means of an unmanned transport track, a cost is taken for both the automated warehouse itself and the unmanned transport track system, and further, a considerably wide space is required.

In addition, traveling control for unmanned transport trucks is extremely complexed, hence the control system becomes expensive, and this becomes one factor for rise of a cost of the entire transport system.

SUMMARY OF THE INVENTION

The present invention has been worked out in view of the above-described shortcomings in the prior art. It is one object of the present invention to provide a green tire feed system between forming and vulcanizing processes, in which a necessary space is made small and reduction of a cost can be achieved.

According to one feature of the present invention, there is provided a green tire feed system between forming and vulcanizing processes for feeding green tires formed by a forming machine or machines to a plurality of vulcanizing machines, comprising pallets each adapted to be charged with green tires, pallet loading tables disposed respectively in front of the respective vulcanizing machines installed in parallel to each other, shelves disposed in opposition to the pallet loading tables, a stacker crane or cranes adapted to travel through the space between the above-referred pallet loading tables and the shelves, a station for loading and unloading the pallet onto and from the stacker crane and control means for controlling the above-described stacker crane.

According to the present invention, since shelves are disposed in opposition to the pallet loading tables in front of the respective vulcanizing machines, carry-in and carry-out of a pallet to and from the shelves are effected by means of a stacker crane traveling through the space between the shelves and the pallet loading tables, also feed and recovery of a pallet to and from the pallet loading table in front of the vulcanizing machine, which were effected by means of an unmanned transport truck in the prior art, can be effected by means of the same stacker crane, and therefore, the unmanned transport truck system including a complexed control system becomes unnecessary and great reduction of a cost can be achieved.

Furthermore, since the vulcanizing machines and the shelves are placed close to each other and there is no need to insure a traveling space for an unmanned transport truck, the space for the feed system can be greatly reduced.

As described above, according to the present invention it is possible to realize perfect automation of a green tire feed system while greatly reducing a cost and a space of the system.

BRIEF DESCRIPTION OF THE DRAWINGS

FIG. 3 is a perspective view of a stacker crane employed in the same preferred embodiment;

FIG. 4 is a plan view of a vulcanizing machine and a pallet loading table in the same preferred embodiment.

DESCRIPTION OF THE PREFERRED EMBODIMENT

In the following, a description will be made of one preferred embodiment of the present invention illustrated in FIGS. 1 to 4.

Figure 1:
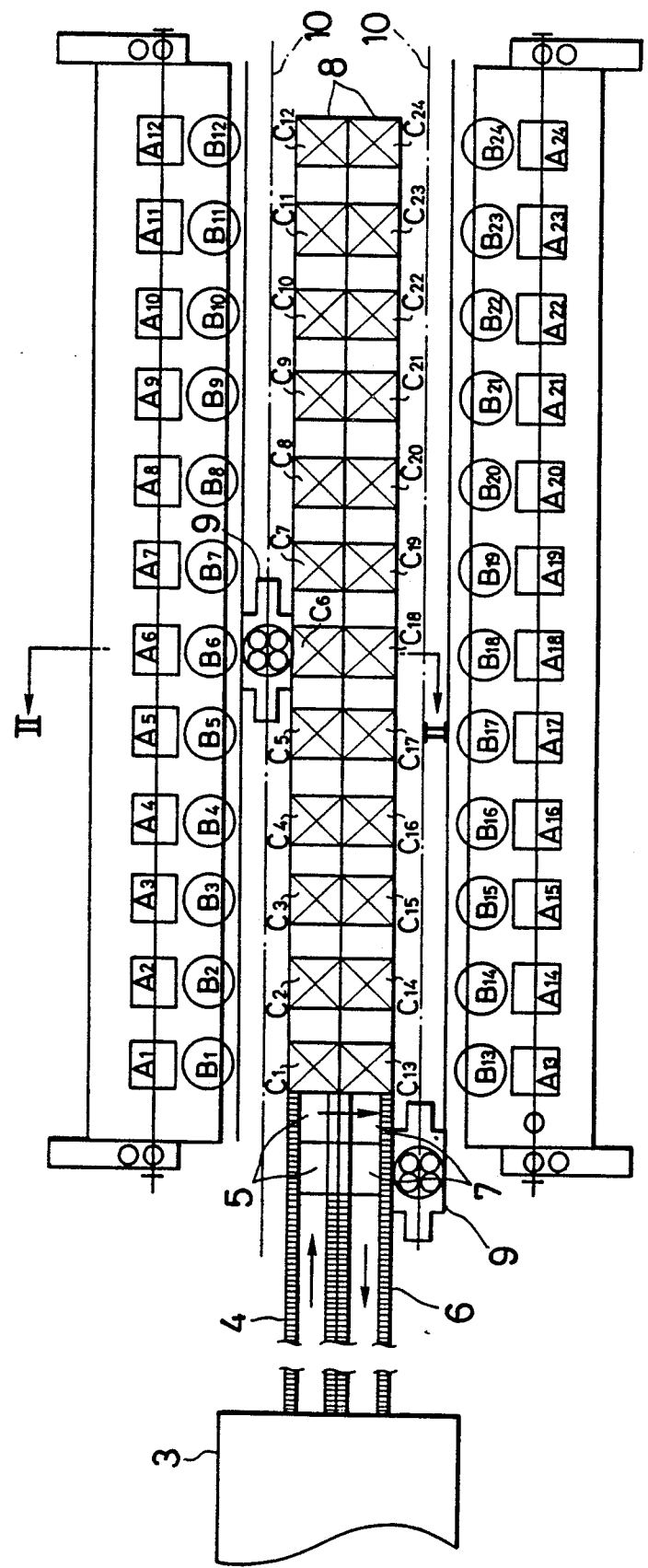
FIG. 1 is a schematic plan view of a green tire feed system for vulcanizing machines according to one preferred embodiment of the present invention.

A green tire feed system according to one preferred embodiment of the present invention is shown in a schematic plan view in FIG. 1.

Reference numeral 3 designates a forming process station, in which a plurality of forming machines are disposed though not shown, and an unmanned transport truck for transporting green tires 1 (FIG. 4) is traveling through the space between the forming machines.

The green tires 1 are adapted to be transported as charged in a pallet 2, and each pallet 2 can be charged with 4 sets of vertically stacked green tires each consisting of three green tires, and so, can transport simultaneously 12 green tires at the maximum.

Green tires 1 formed by a forming machine is transported by an unmanned transport truck as charged in a pallet 2, then they are loaded on a carry-in conveyor 4 and transported to a receiving station 5 although the midway is omitted from illustration.

In juxtaposition to the carry-in conveyor 4 and the receiving station 5, there are disposed a carry-out conveyor 6 and a delivering station 7 so that an empty pallet not charged with any green tire may be carried out to the side of the forming process station 3.

In extension from the receiving station 5 and the delivering station 7, there are disposed three-dimensional shelves 8 each having two, upper and lower shelf spaces in two rows in a back-to-back relation, and in each shelf space can be accommodated pallets 2.

In parallel to front surfaces of the three-dimensional shelves 8, there are arrayed a plurality of vulcanizing machines $A_1, A_2, \ldots A_{24}$, and pallet loading tables $B_1, B_2, \ldots B_{24}$ are disposed in front of the respective vulcanizing machines $A_1, A_2, \ldots A_{24}$.

Shelf spaces $C_1, C_2, \ldots C_{24}$ at two levels of the above-mentioned three-dimensional shelves 8 are respectively positioned at the locations opposed to the respective pallet loading tables $B_1, B_2, \ldots B_{24}$.

And, along a passageway between the pallet loading tables $B_1, B_2, \ldots B_{24}$ and the three-dimensional shelves 8 are laid upper and lower rails 11 and 10, and stacker cranes 9 are equipped so as to be able to travel as supported by these rails 11 and 10.

Figures 3, 4:
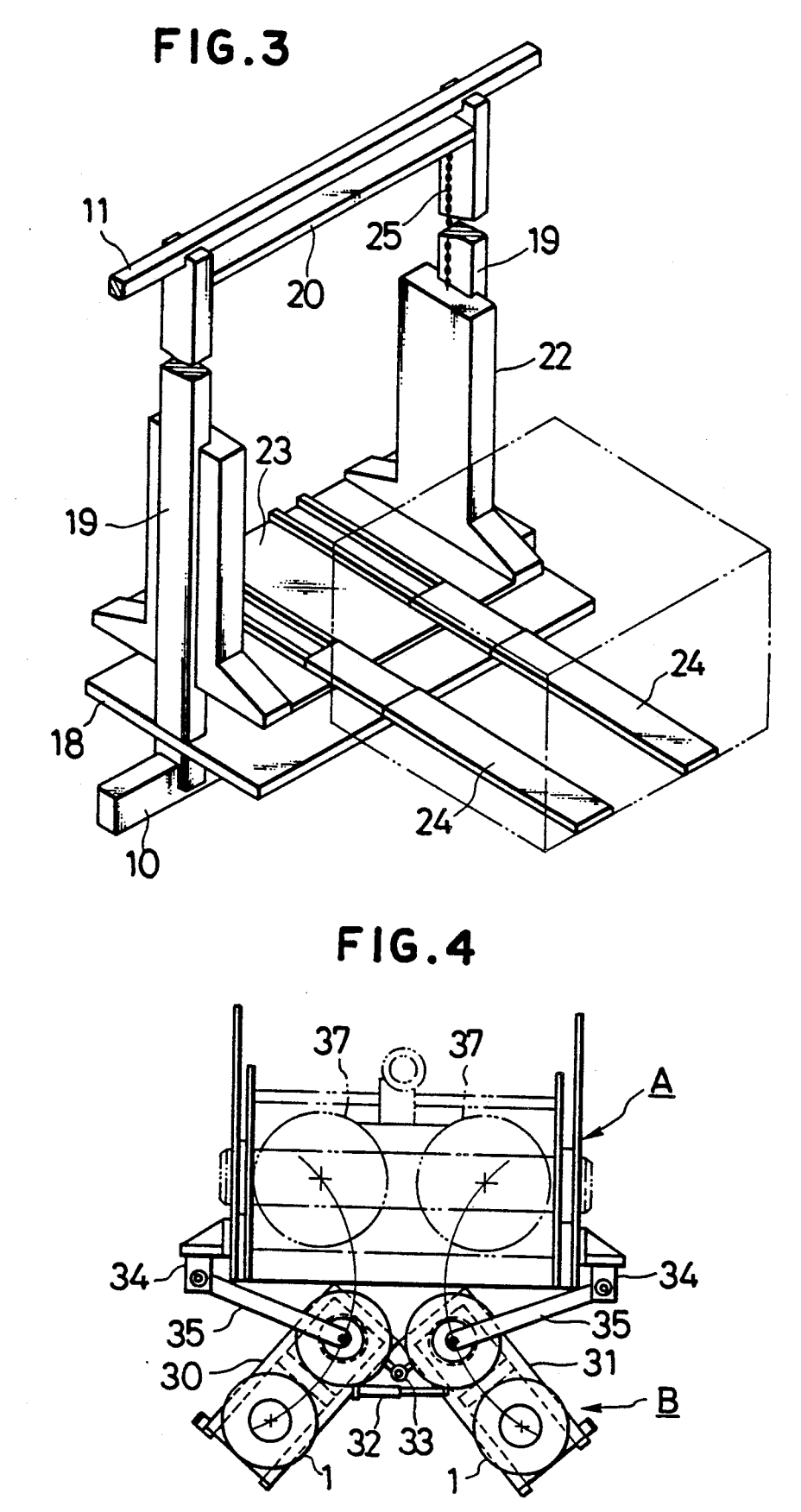

FIG. 3 shows this stacker crane 9 in a perspective view. In this figure, on the left and right of a pedestal 18 supported by the rail 10 are erected support pillars 19 vertically upwards, the upper end portions of the respective support pillars 19 are bridged by a connecting support member 20, furthermore at the top of the support pillars 19 are formed recesses so that a ceiling rail 11 laid in parallel to a floor rail 10 penetrates through the recesses and wheels not shown are fitted to the same rail 10.

Figure 2:
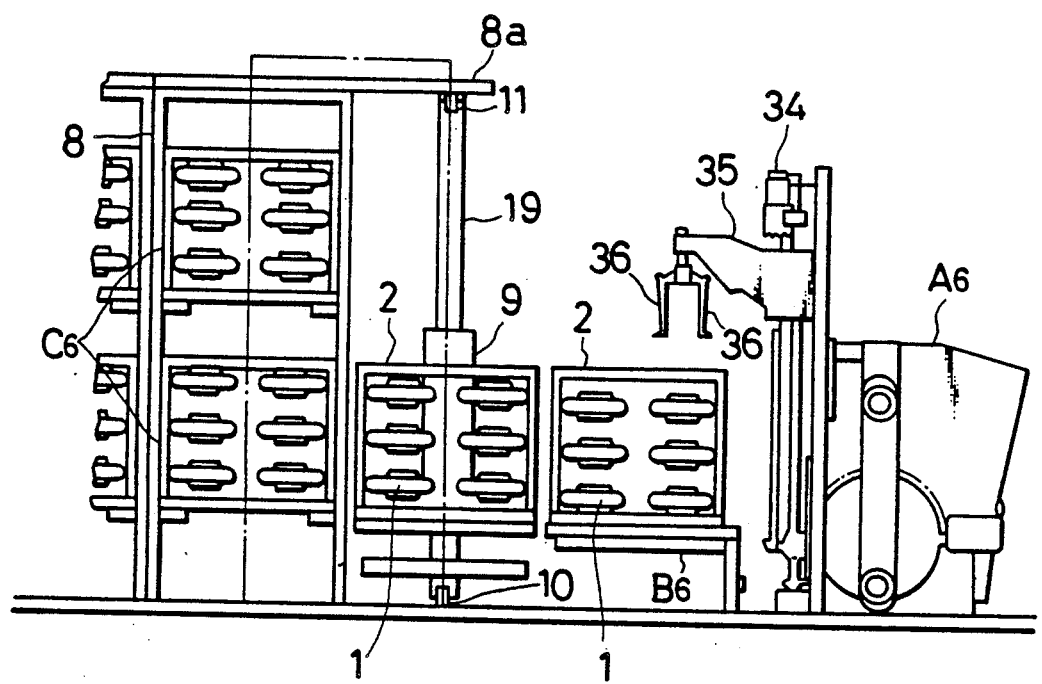
FIG. 2 is a vertical cross-section view taken along line II—II in FIG. 1 as viewed in the direction of arrows.
Figure 5:
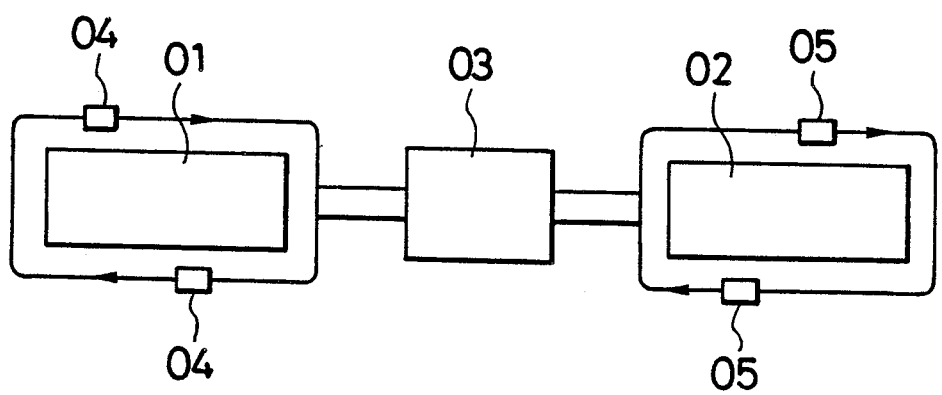
FIG. 5 is a schematic plan view of a green tire feed system in the prior art.

It is to be noted that the ceiling rail 11 is fixedly secured to eaves 8a projecting from a top plate of the three-dimensional shelves 8 towards the traveling path of the stacker crane 9 (See FIG. 2).

Accordingly, the stacker crane 9 can travel stably along the floor rail 10.

In addition, slide members 22 having a U-shaped cross-section are fitted to the support pillars 19 by the recesses of the U-shape so that they can freely slide up and down along the support pillars 19, the lower ends of the slide members 22 are broadened in the back and forth directions, and a loading platform 23 is formed so as to bridge the bottoms of the left and right slide members 22.

On the loading platform 23 are disposed two forks 24 which are expansible and contractible in the back and forth directions.

Furthermore, chains 25 having their one ends fixedly secured to the top surfaces of the respective slide members 22 extend upwards, then they are turned back via pulleys (not shown) and extend downwards within the respective support pillars 19 so that they can be wound up around take-up pulleys driven by an electric motor (both not shown), and thereby the slide members 22 and the loading platform 23 can integrally slide up and down as driven by the motor.

Hence, the above-mentioned stacker crane 9 can lift up a pallet 2 by projecting the forks 24 horizontally along the bottom surface of the pallet 2 at a predetermined level and then somewhat raising the forks 24, can load the pallet 2 on the loading platform 23 by retracting the forks 24, can transport the pallet 2 to a predetermined position by traveling along the rails 10 and 11, and thereafter can place the pallet 2 at the predetermined position by performing operations opposite to the above-described operations.

As best seen by reference to FIG. 2 which is a cross-section view taken along line II—II in FIG. 1, pallets are transported by the above-described stacker crane 9, at a predetermined position a full pallet 2 charged with green tires 1 can be stored in a desired shelf space C in the three-dimensional shelves 8, thereafter at an appropriate time point the same full pallet 2 can be taken out, and now it can be placed on a predetermined pallet loading table B (for instance, a pallet loading table $B_6$).

The stacker crane 9 can also recover an empty pallet 2 which has become empty on the pallet loading table B as a result of feeding of the green tires 1 to a vulcanizing machine A.

The pallet loading table B disposed in front of the vulcanizing machine A in association with the latter consists of left and right frames 30 and 31 as shown in FIG. 4, and it is possible to swing the left and right frames 30 and 31 horizontally about a pivot shaft 33 by means of an air cylinder 32 to expand them. In this connection, the pallet 2 also can be divided into two halves.

At the opposite ends of the front of the vulcanizing machine A are provided loaders 34, in which grip claws 36 projecting vertically downwards are provided at an end portion of an arm 35 which is vertically slidable and horizontally swingable.

As shown in FIG. 4, under the condition where the frames 30 and 31 have been expanded, the tip end portions of the left and right arms 35 are located on circles passing the center axes of the green tires 1 and center axes of press molds 37 of the vulcanizing machine A.

Accordingly, the arms 35 are appropriately swung up and down to grip and take out the green tires 1 within the expanded pallet 2 with the aid of the grip claws 36, and thereby the green tires 1 can be mounted in the press molds 37.

It is to be noted that details of the pallet 2 and the pallet loading table B are obvious from the Japanese Laid-Open Patent Publication Nos. 62-55124 (1987) and 62-53806 (1987).

In the green tire feed system constructed in the above-described manner, a pallet 2 charged with predetermined green tires 1 is transported from a forming machine to a desired vulcanizing machine A as controlled by a control system relying upon a computer, not shown. In the following, a series of operations therefor will be explained.

It is to be noted that the computer knows the kinds and working states of all the vulcanizing machines (operating in different press modes) respectively, and also it always supervises the state of use of the three-dimensional shelves 8 and holds the information of the kinds of pallets as well as the kinds of green tires charged therein and the like.

At first, green tires 1 formed through the forming process 3 are transported by the carry-in conveyor 4 up to the receiving station 5 under a vertically staked condition on the pallet 2.

While the details of the above-mentioned processes are omitted from explanation, they are carried out automatically.

It has been already known by the computer of what kind and of what size are the green tires 1 charged in the full pallet 2 that reached the receiving station 5, hence a vulcanizing machine Ai corresponding to such green tires 1 is selected, and an unused empty shelf space Ci opposed to that vulcanizing machine Ai is chosen as a location for storing the same green tires 1.

Therefore, if the empty shelf space Ci is any of the shelf spaces $C_1$-$C_{12}$, then the stacker crane 9 is brought to the front of the receiving station 5, the full pallet 2 is loaded on the loading platform 23 by means of the forks 24, and the stacker crane 9 travels up to the selected shelf space Ci to temporarily store the same full pallet 2 in that shelf space Ci.

Whereas, if the empty shelf space Ci is anyone of the shelf spaces $C_{13}$-$C_{24}$, then after the full pallet 2 transported up to the receiving station 5 has been transferred to the delivering station 7 by means of a transfer conveyor (not shown), the same pallet 2 is stored in the selected shelf space Ci by means of the stacker crane 9.

When the green tires 1 in the pallet 2 that was previously placed on the pallet loading table Bi have been taken out by the loaders 34 associated with the vulcanizing machine Ai and the same pallet 2 has become empty, a green tire demand signal is sent to the computer, hence the stacker crane is controlled on the basis of the same demand signal so that the stacker crane 9 may travel to recover the emptied pallet 2 and when the empty pallet 2 has been loaded on the stacker crane 9, if the receiving station 5 (or the delivering station 7) is not in use, the stacker crane 9 may transport the empty pallet 2 up to the receiving station 5 (or the delivering station 7), but if the receiving station 5 (or the delivering station 7) is in use, the empty pallet 2 may be temporarily stored in an empty shelf space.

The empty pallet 2 placed at the receiving station 5 is transferred to the delivering station 7 by means of the transfer conveyor, and it would be transported to the forming process station 3 by means of the carry-out conveyor 6.

If the pallet loading table Bi becomes empty through the above-mentioned processes, the stacker crane 9 transfers the full pallet 2 that is temporarily stored in the shelf space Ci from the shelf space Ci to the pallet loading table Bi.

At this moment, since the shelf space Ci and the pallet loading table Bi are located at positions opposed to each other, the stacker crane 9 is necessitated merely to transfer the pallet 2 without traveling, and therefore, shortening of operation time as well as simplification of control can be achieved.

It is to be noted that when a full pallet 2 has reached the receiving station 5 as transported by the carry-in conveyor 4 and the stacker crane 9 receives this full pallet 2 and is going to transport it to a desired shelf space Ci, if the opposed pallet loading table Bi is already empty, then the stacker crane 9 would directly place it on the pallet loading table Bi without storing it in that shelf space Ci.

As described above, according to the present invention, there is no need to transport pallets between three-dimensional shelves 8 and vulcanizing machines by means of an unmanned transport truck as is the case with the transport system in the prior art, but a stacker crane 9 which performs carry-in and carry-out to and from three-dimensional shelves 8 can also perform the transportation, and so, great reduction of a cost can be realized.

Moreover, since vulcanizing machines and three-dimensional shelves 8 are placed close to each other and an unmanned transport truck is not necessitated, the necessary space can be also reduced greatly.

Next, description will be made on another example of control for transportation that is different from that employed in the above-described embodiment.

According to this example of control, the temporary storage of a full pallet 2 in the three-dimensional shelves 8 is not limited to the shelf space Ci in front of the vulcanizing machine Ai corresponding to the green tires 1 in that full pallet as is the case with the above-described embodiment, but if the shelf space Ci is not empty, the full pallet 2 is stored in any empty shelf space among shelf spaces $C_1 \sim C_{i-1}$ (or $C_{13}$-$C_{i-1}$), and furthermore, if none of these shelf spaces is empty, the full pallet 2 is stored in any empty shelf space among the remaining shelf spaces. The reason why the preference is determined in the above-described manner is because it is desired to minimize the traveling distance of the stacker crane 9.

In addition, according to this example of control, time control for the stacker crane 9 is effected for the purpose of transporting pallets 2 most efficiently.

The work performed by the stacker crane 9 in order to replace a full pallet for an empty pallet on a pallet loading table Bi associated with a given vulcanizing machine Ai. At first the stacker crane 9 recovers the empty pallet 2 on the pallet loading table Bi and transports it to the receiving station 5 or the delivering station 7, next it travels up to a shelf space Cj where a desired full pallet 2 is stored in order to get that full pallet 2, then the same full pallet 2 is loaded on the stacker crane 9, and it is transported to and placed on the pallet loading table Bi where the above-mentioned empty pallet 23 was recovered.

If the replacement of the pallet 2 on the pallet loading table Bi is complete before all the green tires 1 in the last pallet 2 are vulcanized, the vulcanizing machine Ai can dispense with a wasteful waiting period.

Therefore, when the loader 34 associated with the vulcanizing machine Ai has picked up the last green tire 1 on the pallet loading table Bi, a green tire demand signal is sent to the computer.

The time period Ai from the time point M when this demand signal is transmitted up to the time when the last green tire 1 has finished to be vulcanized is a constant time determined for each vulcanizing machine, and it is a preliminarily known time.

In addition, an approximate drive period during which the stacker crane 9 recovers an empty pallet form the pallet loading table Bi, then placed it at the receiving station 5 (or the delivering station 7), further travels to a shelf space Cj where a desired full pallet 2 is stored, then takes out the full pallet 2, and finally places that full pallet 2 on the pallet loading table Bi, can be calculated on the basis of the respective positions of the shelf space Cj and the desired pallet loading table Bi.

Therefore, the latest departure time when the traveling of the stacker crane 9 is to be commenced at the latest, is determined as a time T derived by subtracting the above-referred drive period from the vulcanization finish time ($M+a_i$), that is, by the following formula:

$$T = M + a_i - b_i$$

Accordingly, if the stacker crane 9 begins to travel at the latest by the time T and performs recovery of the empty pallet 2 and loading of the full pallet 2 on the pallet loading table Bi, then at the moment when the vulcanizing machine Ai has finished to vulcanize the previous green tire 1, the next full pallet 2 would be placed on the pallet loading table Bi, and so, the vulcanizing machine Ai would have a waiting period.

It is to be noted that since the demand signal is issued not only from the single vulcanizing machine Ai but is transmitted randomly from a plurality of vulcanizing machines, the computer would calculate the individual latest departure times T on the basis of the respective demand signals and would control the stacker crane 9 to travel to the corresponding vulcanizing machines sequentially starting from the machine having the earliest one of the latest departure times. Owing to the above-described mode of control, transport efficiency can be maintained very high.

It is to be noted that the work of storing a full pallet 2 in the three-dimensional shelves is carried out by making use of idle time between the above-described works of replacing a full pallet 2 for an empty pallet 2 on the pallet loading table.

During the period, since the shelf space where a full pallet 2 is to be stored is not limited, even in the case where production of a certain kind of tires has been increased as compared to the other kinds of tire, the subject system can deal with the increase.

Moreover, in the event that the number of pallets to be temporarily stored in the three-dimensional shelves 8 is further increased, in the first-described preferred embodiment it is only necessary to increase shelf spaces at the above, and in the last-described preferred embodiment it is possible to additionally provide shelf spaces not only at the above but also on the left and right hands.

According to the present invention, owing to the fact that shelves are disposed in opposition to pallet loading tables provided in front of the vulcanizing machines as associated therewith and a stacker crane is made to travel along the space between these members, a group of vulcanizing machines and shelves can be disposed at one location close to each other, and so, a space necessitated for a green tire feed system can be greatly reduced.

In addition, since the stacker crane can perform both the carry-in and carry-out of pallets to and from the shelves and the loading and recovery of pallets onto and from the pallet loading table, the complex and expensive unmanned transport truck system is made unnecessary and thereby great reduction of a cost can be realized.

What is claimed is:

1. A green tire feed system between forming and vulcanizing processes for feeding green tires formed by forming machine means and then placed on pallets and delivered to a plurality of vulcanizing machines comprising;

a pallet receiving station;

pallet sending means for sending said pallets from said forming machine means to said pallet receiving station and from said pallet receiving station back to said forming machine means;

a plurality of vulcanizing machines positioned in a row;

pallet loading tables disposed respectively in front of the respective vulcanizing machines in a row parallel with said row of the vulcanizing machines;

shelves disposed in opposition to said pallet loading tables in a row parallel with said row of the pallet loading tables;

a passageway formed between said row of said pallet loading tables and said row of said shelves, said pallet receiving station being positioned along said passageway at an end thereof;

a stacker crane traveling through said passageway and having means for loading and unloading said crane with pallets;

means controlling said stacker crane for direct transportation of pallets by said stacker crane between said pallet receiving station and said shelves, between said pallet receiving station and said pallet loading tables and between said shelves and said pallet loading tables; and loaders disposed respectively on the respective vulcanizing machines for taking out the green tires from the pallets on said pallet loading tables and loading them into said vulcanizing machines.

2. A green tire feed system between forming and vulcanizing processes as claimed in claim 1, wherein said pallet has an area to be charged with a plurality of green tires arranged along horizontal planes stacked vertically in multiples.

3. A green tire feed system between forming and vulcanizing processes as claimed in claim 2, wherein said pallet comprises left and right halves which are connected with each other by a pivot shaft and swingable about said pivot shaft with respect to each other, and said pallet loading table comprises left and right halves which are connected with each other by a pivot shaft and swingable about said pivot shaft with respect to each other.

4. A green tire feed system between forming and vulcanizing processes as claimed in claim 1, wherein said stacker crane is provided with a loading platform and forks projecting from and retracting to said loading platform in a direction perpendicular to said passageway for loading and unloading said loading platform with pallets.

5. A green tire feed system between forming and vulcanizing processes as claimed in claim 1, wherein said pallet comprises left and right halves which are connected with each other by a pivot shaft and swingable about said pivot shaft with respect to each other, and said pallet loading table comprises left and right halves which are connected with each other by a pivot shaft and swingable about said pivot shaft with respect to each other.

* * * * *